Feb. 6, 1968

K. D. MADSEN 3,368,087

ROTATING ELECTRIC HIGH POWER MACHINE
WITH SUPER-CONDUCTING STATOR

Filed July 20, 1964

INVENTOR.
KRISTIAN DAHL MADSEN

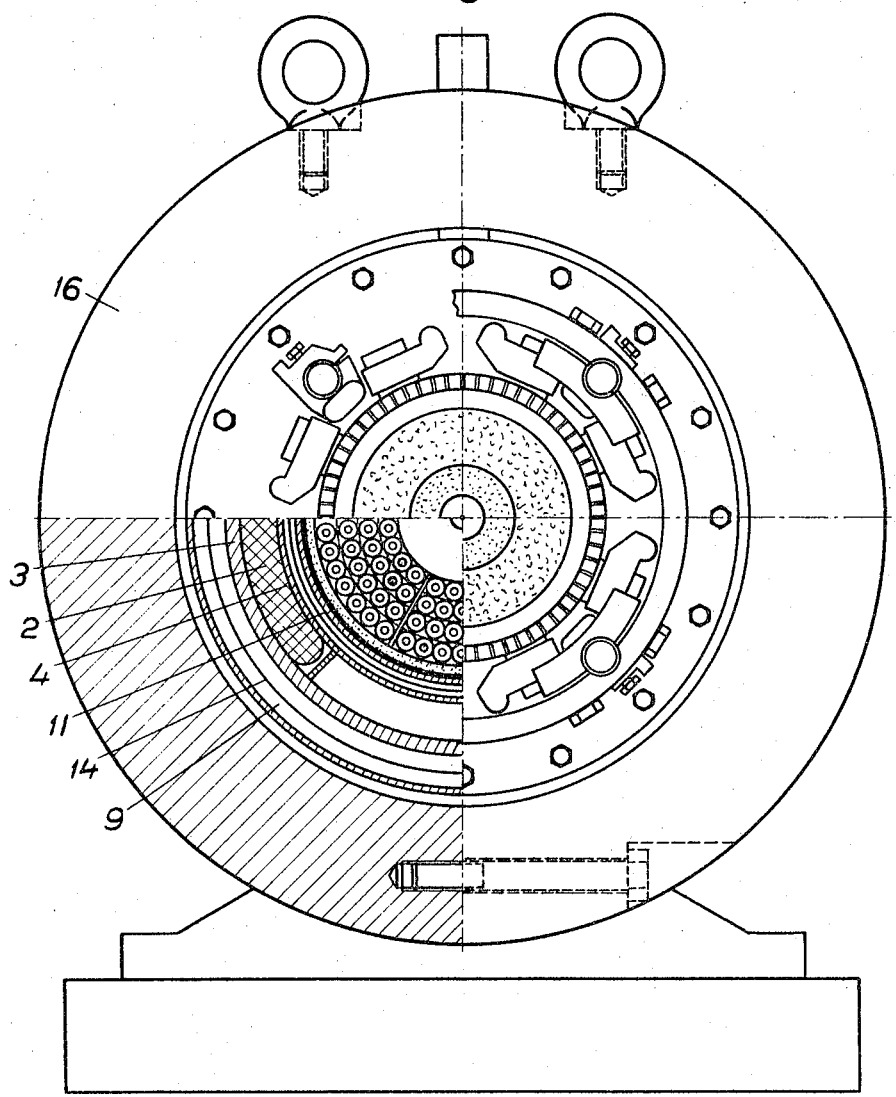

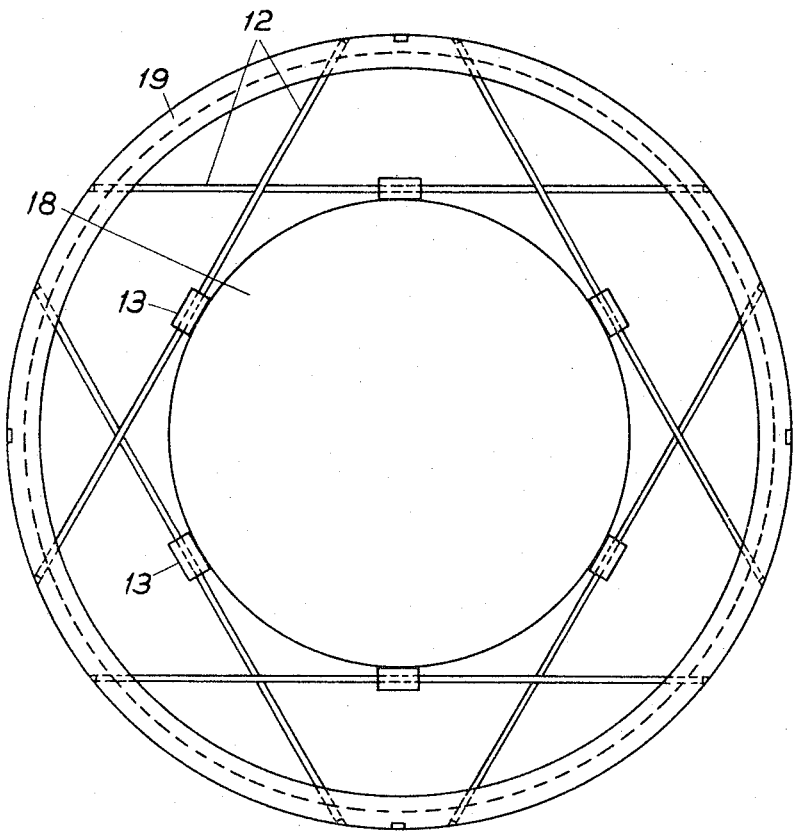

United States Patent Office

3,368,087
Patented Feb. 6, 1968

3,368,087
ROTATING ELECTRIC HIGH POWER MACHINE
WITH SUPER-CONDUCTING STATOR
Kristian Dahl Madsen, Vasteras, Sweden, assignor to
Allmänna Svenska Elektriska Aktiebolaget, Vasteras,
Sweden, a Swedish corporation
Filed July 20, 1964, Ser. No. 383,865
Claims priority, application Sweden, Aug. 16, 1963,
8,976/63
10 Claims. (Cl. 310—10)

ABSTRACT OF THE DISCLOSURE

A rotating electric high power machine with a super-conducting stator winding enclosed in a container for cooling medium, the container surrounding the rotor and including two concentrically arranged cylindrical bodies, the container being suspended in an evacuated space by means of spokes which are arranged non-radially to the stator winding container and are attached to the stator housing.

---

Figure 1:
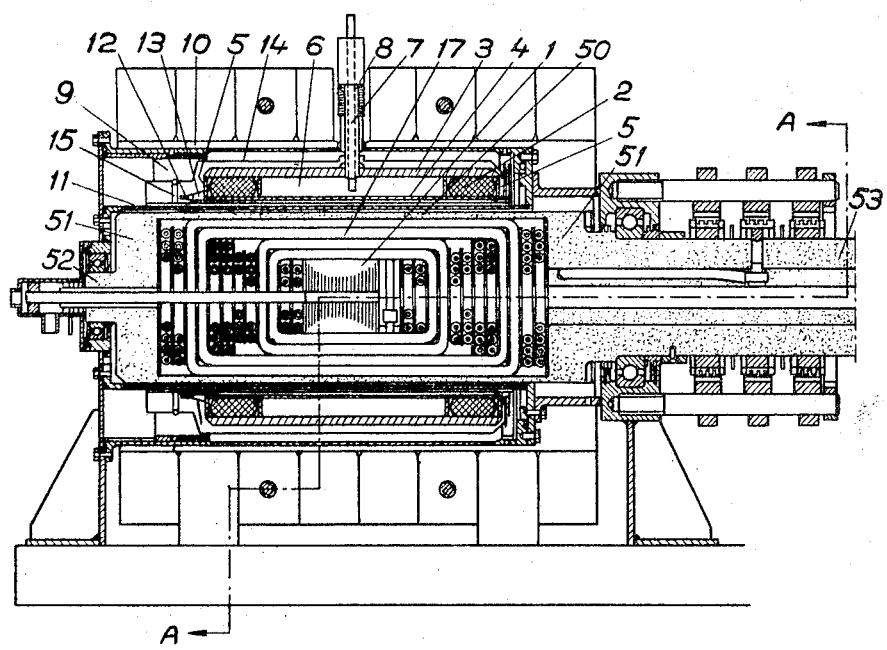

The present invention relates to a rotating electric high power machine including a rotor with an anchor winding and a stator with a magnetising winding, which stator winding consists of super-conducting material and during operation is kept cooled down at least to the super-conducting temperature of the conductor material. By the expression "super-conducting temperature" is meant the temperature at which the conducting properties of a material are converted to super-conducting character. By super-conducting character is meant that the ohmic resistance in the conductor is almost zero and independent of the dimensions of the conductor.

The object of the invention is to effect a simple and economical rotating electric machine of the super-conductor type, which involves relatively small dimensions of the machine in spite of the fact that it is capable of converting very high powers. In a machine according to the invention the stator winding because of its super-conducting properties consists of extremely thin conductors with a diameter considerably less than 1 mm. and in spite of this currents of several tens of amperes may be conducted through such a conductor, whereby the total flow in a coil with only 100 cm.$^2$ cross section is of the order of 1 ma. A stator is thereby obtained which, because of the minimal thickness of the conductor, has extremely small dimensions but where the field intensity is very great because of the high current intensity. The enormously strong magnetic forces which are obtained not only act on the rotor but also effect particularly strong forces between the stator winding coils, so that primarily the repelling outwardly directed force must be taken into consideration. In order to give the stator a construction which on the one hand can resist the strong inner forces in the stator and on the other hand can effectively be insulated so that heat is not transmitted from the surroundings through mounting or fixing arrangements, the stator winding according to the invention is located in a free-standing container heat-insulated from the surroundings, which takes up in the form of purely internal forces the forces between the parts of the stator winding, and which includes two concentrically arranged cylindrical bodies, preferably of non-magnetic material, surrounding the winding on its outer and inner sides respectively.

In order that the conducting material of the stator winding may attain super-conducting properties, the winding must be cooled down to very low temperatures in the vicinity of the absolute zero-point. In order to prevent, in a relatively simple way, heat in any larger quantities being supplied from the surroundings to the cooled stator winding, the stator winding as well as its cooling system are arranged inside an enclosed evacuated space. The coolant which is supplied to the stator cooling system must on delivery have a temperature which is less than the super-conducting temperature of the conductor material. The coolant can be arranged to flow in the immediate vicinity of the stator winding through a tube system or the stator winding container may be composed of two vacuum-tight jointed tubes, which form a hollow casing enclosing the stator winding, cooling medium being supplied to the interior of said casing.

The evacuated space which is preferably arranged to enclose the stator winding and its cooling system, may, in order to increase its insulating effect, be made with limiting surfaces which are highly reflecting for heat rays, for example coated with a gold layer. Since according to Stefan-Boltzmann's law the heat radiation from a surface is proportional to the fourth power of its absolute temperature, even a very small reduction of the temperature difference between the limiting surface of the vacuum space situated close to the stator winding and its outer limiting surface will give a relatively large reduction of the heat radiation through the vacuum space. Since cooling in the vicinity of the absolute zero-point may take place only with extremely low efficiency, even the smallest improvement in heat insulation between the stator and its cooling system on the one hand and the surroundings on the other hand means a considerable saving of energy. Such a small improvement in insulation may be attained if one or several intermediate walls are arranged between the stator winding and the outer limiting surfaces of the vacuum space. Such an intermediate wall blocks the direct heat radiation between the outer and inner surfaces of the vacuum space and will assume a temperature which lies between the temperatures of said outer and inner surfaces. According to Stefan-Boltzmann's law the total heat radiation across both the vacuum spaces on each side of an intermediate wall will be only about half the radiation of the same space without an intermediate wall. The intermediate walls should also, of course, in order to increase their insulating capacity, have surfaces which are highly reflecting for heat rays in the same way as the surfaces of the vacuum space.

The evacuated space may be limited radially outwards by a stator casing and radially inwards by a cylinder attached onto the stator casing and surrounding the rotor. Inside this space the stator winding and its cooling system are suspended in the stator casing and/or the inner cylinder preferably by means of several spokes with low heat conductivity, extending in a tangential direction in relation to the stator winding container. The heat conductivity of the spokes can be kept low partly by choosing a suitable material and partly by making them as long and thin as possible. The earlier mentioned intermediate walls may be supported by at least some of the spokes and they are then attached suitably to the spokes at or near the point where the temperature of the spokes corresponds to the temperature of the intermediate wall as determined only by the heat radiation in the evacuated space. The intermediate walls may also be cooled and cooling medium issuing from the stator winding cooling system may then be used as coolant, since the temperature of the intermediate walls is considerably higher than the temperature of the stator winding. If the coolant to the intermediate walls is conducted through a tube attached to the spokes these also are cooled down somewhat and their heat conductivity thereby decreases further but the cooling of the intermediate walls gives substantially greater energy gain because of decreased heat radiation through the intermediate walls.

In order to prevent high frequency variations in the magnetic field originating from the rotor from causing too great heat generation in the stator winding container caused by eddy current losses, it is suitable to arrange a shield in the form of a copper layer between the rotor and the container. This shield should preferably be located as near as possible to the stator winding container cooled down to super-conducting temperature and this is effected most simply if the stator winding container on its side facing the rotor is provided with a copper layer or if this part of the container is manufactured completely of copper. Copper is in this case an especially suitable material, particularly highly pure copper, since this material under the strong cooling down in question obtains a very greatly increased specific conductivity. Depending on the purity of the copper the conductivity is 1,000–10,000 times higher than at room temperature, without however the copper becoming super-conducting. This very high conductivity of the copper means that the penetration depth is very small and thus gives rise to only very small eddy current losses.

Eddy current losses in the stator winding holder can also be avoided if this is manufactured entirely of electrically insulating material, for example armoured plastic or ceramic material.

In order to suppress possible rotor oscillations the part of the stator which lies nearest the rotor may consist of a material with high specific conductivity, for example copper or aluminum. In this way, as a further advantage, the earlier mentioned high frequency variations in the magnetic field are prevented from influencing the stator winding container to a greater extent than if only the above-described shield with copper is constructed.

As coolant for the stator winding only liquid helium, liquid hydrogen or liquid neon should be considered. Of these three substances, helium has the lowest boiling point and this is already at atmospheric pressure so low that it is less than the super-conducting temperature. The other two substances must be kept under low pressure to keep the boiling point sufficiently low for the intended purpose.

In order to obtain super-conducting properties in the stator winding its conductor should preferably consist of niobium-zirconium alloy or alternatively of a niobium-tin alloy, which alloys are able to keep their super-conducting properties even when they are subjected to high field intensity and high current load.

The invention will be described in more detail in the following with reference to the accompanying figures, which schematically show different embodiments of the invention. FIGURE 1 shows a longitudinal section of a machine according to the invention and FIGURE 2 shows the section A—A in FIGURE 1. FIGURE 3 shows a cross-section of a machine according to the invention at one of the suspension planes of the stator winding.

In the figures 1 indicates the rotor of the machine and 2 its stator winding. The stator winding is surrounded by an outer cylindrical body 3 and an inner cylindrical body 4 which form a container for the coils of the stator winding so that they are not displaced in relation to each other because of the magnetic forces. The bodies 3 and 4 consist of two cylindrical tubes, which by means of welded-on endplates 5 are vacuum tightly connected to each other. Between the tubes 3 and 4 a cavity 6 is formed, to which coolant with a temperature lower than the super-conducting temperature of the stator conductor is supplied through an input conduit 7. As coolant liquid helium is used which partly fills the space 6 and under boiling at atmospheric pressure cools the stator winding 2. Instead of conducting coolant to the space 6, the coolant can be conducted in a closed tube system which in a suitable way is applied in the vicinity of the stator winding 2. From the space 6 the coolant flows in the shown embodiment out through an output conduit 8 which surrounds the input conduit 7, where the advantage is gained that the gas flowing out through the conduit 8 which is still very cold effectively insulates the even colder coolant flowing in from the warmth of the surroundings.

The stator winding 2 and its cooling system must be heat insulated particularly well from the surroundings in order that the extremely low conductor temperature can be kept. An evacuated closed space 9 is therefore arranged to surround completely the stator winding and its cooling system, including the coolant output conduit 8. The space 9 is limited radially outwards by a stator casing 10 and radially inwards by a cylinder 11 surrounding the rotor. The stator winding with its container and its cooling system must however in some way be suspended in the evacuated space 9, in such a way that the suspending device transmits as little heat as possible from the surroundings to the stator winding. The suspension of the stator winding container needs only to take up tangential torsional forces and the container is suspended therefore in a system of tangentially placed spokes 12, which are more clearly shown in FIGURE 3. The spokes 12 may be attached in a suitable way to the stator winding container, for example in fixing members 13 situated thereon. The spokes 12 will be loaded only by tensile forces and may therefore be made very thin, which lessens their heat conductivity. Further lessening of the heat-conductivity of the spokes is obtained by choosing a suitable material with great strength and low conductivity, for example non-magnetic stainless steel or armoured plastic. In order to fix the stator winding container axially the spokes 12 are arranged at the one end of the container so that they intersect a plane perpendicular to the axis of the machine, alternate spokes preferably intersecting the plane at positive and negative angles. At the opposite end of the stator winding container the spokes should allow a certain axial movement which is obtained because of the great temperature differences between the cooled stator in operation and the uncooled stator at standstill. The spokes in the axially unattached end of the stator winding container are therefore arranged substantially parallel with a plane perpendicular to the axis of the machine, so that minor axial movements of the stator winding container are possible. The attachment with spokes in the described way allows also the radial movements of the stator winding container which arise because of the above named great temperature differences.

The spokes are attached approximately at their centre point in the fixing member 13 situated on the stator winding container and their end points are attached to the stator casing 10. The parts of the spokes which lie between the holding member 13 and the stator casing 10 should each be dimensioned with regard to the highest imaginable tension load in each direction. If thus no tension load is thought possible in the one direction the corresponding spoke part should be completely eliminated in order to lessen the heat conductance from the surroundings to the stator winding.

In order to increase the heat-insulating capacity of the evacuated space 9 an intermediate wall 14 is arranged in the space. The intermediate wall 14 has on both sides a surface which is highly reflecting for heat rays which has been effected by plating the intermediate wall with a thin gold layer. In the same way all surfaces limiting the evacuated space 9 are plated with a gold layer. The intermediate wall 14 is supported by the spokes 12 and is cooled with coolant which is supplied through the tube 15. The cooling tube 15 extends along the intermediate wall 14 at its attachment points 15 to the spokes 12, whereby the spokes are also cooled by the tube 15 so that their heat conductivity is further lessened. As coolant in the tube 15 the helium gas flowing out from the space 6 may be advantageously used, the still very small heat content of which may be used for cooling all parts of the system where the temperature markedly exceeds the temperature of the stator winding.

In order that no heat shall be supplied to the intermediate wall 14 by conduction, this is attached to the spokes 12 at the point where the temperature of the spokes corresponds to the temperature of the intermediate wall as determined only by the heat radiation in the space.

In the shown embodiment the stator is surrounded by a thick-walled ferromagnetic hollow cylinder 16, the inner surface of which has substantially the form of a circular cylinder. This hollow cylinder conducts the magnetic flow with very little resistance, but because of the small dimensions of the machine in other respects, makes up a substantial part of its total weight. If one wishes to produce an extremely light machine according to the invention the hollow cylinder 16 may be completely eliminated and the thereby impaired conduction of the magnetic flow is compensated by a somewhat increased number of winding turns in the stator winding.

In order that the very high magnetic induction which is generated by the stator in a machine according to the invention can be used in the rotor, this should preferably be made as a slotless armature 1 with direct-cooled anchor winding 17. In this way there is obtained on the one hand maximum copper area per length unit of the rotor circumference and on the other hand also a sufficiently effective cooling for the high powers. If the iron core of the rotor in large machines is so heavy that difficulties arise in constructing the axle so that it has a sufficiently high critical speed, one can very well consider replacing the iron core by a material with lower density, for example armoured plastic or some light metal alloy and compensate the impaired conductance of the magnetic flow with such a core with an additional number of winding turns in the stator winding.

The torque forces of the machine are generated in the rotor winding 17, but at high speeds this is pressed outwards by the centrifugal force so that it is difficult to transmit the torque forces to the slotless core 1 and over this to a shaft. The winding 17 may however be surrounded by a hollow cylinder 50 which is rigidly connected through end bodies 51 with external stub shafts 52 and 53. The cylinder 50 is made preferably of nonmagnetic material which is given a strong pre-stress in order that it can be made with as little thickness of material as possible. The cylinder 50 and at least the end body 51 are dimensioned to transmit the main part of the machine power to the stub shaft 53. In the shown embodiment the cylinder 50, the end body 51 and the stub shafts 52 and 53 consist of reinforced plastic, i.e., glass-fibre reinforced epoxy resin.

FIGURE 3 shows an axial view of the suspension of the stator winding and its container and cooling system. The suspended unit is shown substantially at 18. The fixing member 13 is attached to the unit 18 and the spokes 12 extend between the fixing member 13 and a suspending ring 19 arranged on the stator casing. Possibly one half of the spokes may be left out if the construction and way of operation of the machine are such that torque forces between the stator winding and the casing arise in only one direction.

The invention is not limited to the shown embodiments but a plurality of modifications may be feasible within the scope of the following claims.

I claim:

1. Rotating electric high power machine including a rotor with an anchor winding and a stator with a magnetising winding, the magnetising winding comprising super-conducting material, means for cooling said magnetising winding during operation down at least to the super-conducting temperature of the super-conducting material, a container enclosing said stator winding, means heat-insulating the container from its surroundings, said container including two concentrically arranged cylindrical bodies, said bodies holding the winding together and surrounding it on both outer and inner sides, said heat-insulating means comprising a stator casing forming an evacuated space and limiting such space radially outward, a cylinder surrounding the rotor and attached on the stator casing limiting the space radially inward, means suspending the container in the space comprising a plurality of spokes with low heat-conductivity attached to said stator casing, each spoke being at least substantially parallel to a plane tangential to the stator winding container.

2. Machine according to claim 1, in which the parts of said spokes situated on both sides of the attachment points of the spokes to the stator winding container are dimensioned with regard to the highest calculated tension load in each direction.

3. Machine according to claim 1, in which a number of spokes at one end of the stator winding container axially fix the stator winding, said last spokes intersecting a plane perpendicular to the longitudinal axis of the machine, and the spokes at the other end of the container running substantially parallel to said plane.

4. Machine according to claim 3, in which alternate spokes in the first-named end are arranged alternately at positive and negative angles in relation to a plane perpendicular to the longitudinal axis of the machine.

5. Machine according to claim 1, having an intermediate wall in said evacuated space supported by at least some of the spokes.

6. Machine according to claim 5, the intermediate wall being attached to the spokes near the point where under operating conditions the temperature of the spokes corresponds to the temperature of the intermediate wall as determined only by the heat rays in the evacuated space.

7. Rotating electric high power machine as claimed in claim 1, having an intermediate wall in said evacuated space supported by at least some of said spokes, and means to cool the intermediate wall including means to conduct the cooling medium through a tube attached to the spokes, whereby the spokes also are cooled.

8. Rotating electric high power machine including a rotor with an anchor winding and a stator with a magnetising winding, the magnetising winding comprising super-conducting material, means for cooling said magnetising winding during operation down at least to the super-conducting temperature of the super-conducting material, a container enclosing said stator winding, means heat-insulating the container from its surroundings, said container including two concentrically arranged cylindrical bodies, said bodies holding the winding together and surrounding it on both outer and inner sides, the rotor comprising a slotless armature drum with a direct-cooled anchor winding, a hollow cylinder enclosing the rotor winding, stub shafts arranged at the rotor ends, and end bodies arranged axially outside the rotor winding connecting said cylinder with said stub shafts, the hollow cylinder being formed of reinforced plastic.

9. Machine according to claim 8, in which the stub shafts of the machine are formed of reinforced plastic.

10. Rotating electric high power machine including a rotor with an anchor winding and a stator with a magnetising winding, the magnetising winding comprising super-conducting material, means for cooling said magnetising winding during operation down at least to the super-conducting temperature of the super-conducting material, a container enclosing said stator winding, means heat-insulating the container from its surroundings, said container including two concentrically arranged cylindrical bodies, said bodies holding the winding together and surrounding it on both outer and inner sides, the stator winding container on its side facing the rotor being composed of copper.

References Cited
UNITED STATES PATENTS

| | | | |
|---|---|---|---|
| 2,687,695 | 8/1954 | Blom | 310—86 X |
| 3,005,117 | 10/1961 | Buchhold | 310—40 |
| 3,239,697 | 3/1966 | Stekly | 310—11 |
| 3,242,418 | 3/1966 | Mela | 310—52 X |

DAVID X. SLINEY, *Primary Examiner.*